July 19, 1966    L. L. HOLZENTHAL ET AL    3,261,466
COTTONSEED CLEANER AND FRACTIONATOR
Filed June 25, 1963    2 Sheets-Sheet 1

INVENTORS
LEO LEONHARD HOLZENTHAL
EDWARD A. GASTROCK

BY    *R. Hoffman*

ATTORNEY

July 19, 1966    L. L. HOLZENTHAL ETAL    3,261,466
COTTONSEED CLEANER AND FRACTIONATOR
Filed June 25, 1963    2 Sheets-Sheet 2

INVENTORS
LEO LEONHARD HOLZENTHAL
EDWARD A. GASTROCK

BY

ATTORNEY

United States Patent Office 3,261,466
Patented July 19, 1966

3,261,466
COTTONSEED CLEANER AND FRACTIONATOR
Leo Leonhard Holzenthal, New Orleans, and Edward A. Gastrock, Metairie, La., assignors to the United States of America as represented by the Secretary of Agriculture
Filed June 25, 1963, Ser. No. 290,565
4 Claims. (Cl. 209—120)

A non-exclusive, irrevocable, royalty-free license in the invention herein described, throughout the world for all purposes of the United States Government, with the power to grant sublicenses for such purposes, is hereby granted to the Government of the United States of America.

This invention relates to cleaning and fractionating cottonseed. More particularly, this invention provides an apparatus for cleaning and fractionating cottonseed, and a cottonseed fractionating process for separating the particles normally present in cottonseed into a fraction consisting essentially of seeds substantially free of foreign particles and, if desired, into several additional valuable fractions.

As used herein, the term "cottonseed" is used to refer to the cottonseed produced by ginning seed cotton to remove lint, and to be generic to cottonseeds from which some or all of the linters have been removed.

The cleaning of cottonseed is a problem of long standing. The seeds are unique particles of relatively low specific gravity which are usually covered with varying amounts of short cotton fibers, or linters. The seeds tend to clump together and to become entangled with almost any foreign matter particles with which they come into contact. In recent years, increased usage of rough hand picking, snapping, mechanical methods of picking, stripping, and sledding has increased the foreign matter content of cottonseed and has made the cottonseed cleaning problem more acute than ever.

In addition to being mixed with foreign matter, the seeds vary among themselves and the usual cottonseed contains some seeds which are normally developed (i.e., those in which the kernels contain the usual proportions of cottonseed oil (glycerides) and protein) mixed with some seeds which are poorly developed (i.e., those which are substantially completely cellulosic and whose kernels are undeveloped or damaged by insects, bacteria and the like).

A primary object of the present invention is to provide an apparatus for fractionating cottonseed involving a series of simple mechanical operations. A further object is to provide an apparatus which can be used to isolate the normal or better-developed seeds from the poorly developed seeds, as well as to isolate substantially all of the seeds from the foreign matter such as sticks or stems, cotton boll fragments, leaves, fine field trash, sand, and the like which are usually present in the cottonseed as it is produced by the ginning operation. Another object is to provide a cottonseed fractionating apparatus which can be used advantageously in conjunction with existing mill equipment such as delintering equipment, conveying equipment, cleaning, hulling and meats purification equipment, and the like equipment with which cottonseed is conventionally handled and processed.

We have found that when the particles normally present in cottonseed are carried by their own momentum through air at an air speed at which the wind resistance of the particles appreciably affects the distance they will travel through the air, the particles which contain the greatest proportion of oil and proteins tend to travel farthest. This makes it possible to isolate the normally developed seeds (which are average oil- and protein-containing particles) from leaves, stems, undeveloped or damaged seeds and the like (which are substantially cellulosic particles). It also makes it possible to further fractionate the normally developed seeds to isolate substantially linter-free seeds, or even the seeds bearing the longest or the shortest linters. Such fractionations make it possible to isolate the fractions of seeds which can most efficiently be used for particular purposes. For example, the process can be used to isolate the best seeds for planting, the best seeds for the production of first-, second-, or third-cut linters, and the like.

Substantially any cottonseed can be suitably fractionated by the process of this invention. Illustrative examples of suitable cottonseeds include the undelintered cottonseed as it is discharged from the cotton gin, undelintered cottonseed as it is discharged from the conventional cottonseed cleaning machines, partially delintered cottonseed as it is discharged from the third, or final, cut delintering machines, and the like. Where undelintered cottonseed as it is usually received at the cottonseed oil mill is employed, the cottonseed is preferably first freed of the easily removable contaminants, such as large field trash, metal, unattached lint and/or linters, grabbots, and the like, by means of the usual processes such as screening with shaker screens and the like. Cotton as picked and removed from the cotton boll is referred to by the industry as "seed cotton" since at this stage the cotton fiber contains cottonseeds. The cotton gin removes only the long fibers from the cottonseed. The long fibers at this stage are referred to by the industry as cotton or cotton lint. The short fibers which remain attached to the lint-free cottonseeds are removed at cottonseed oil mills by the use of so-called linter machines. Short fibers or linters are removed in one or more passes through the linter machines affording "mill-run," "first cut," and "second cut linters." Short fibers or linters are commonly used for felting purposes or for chemical operations such as the production of bleached pulp, rayon, gun cotton, and the like.

One, but not necessarily the only, embodiment of an apparatus suitable for the practice of this invention is described in the accompanying drawings in which.

Figure 1:
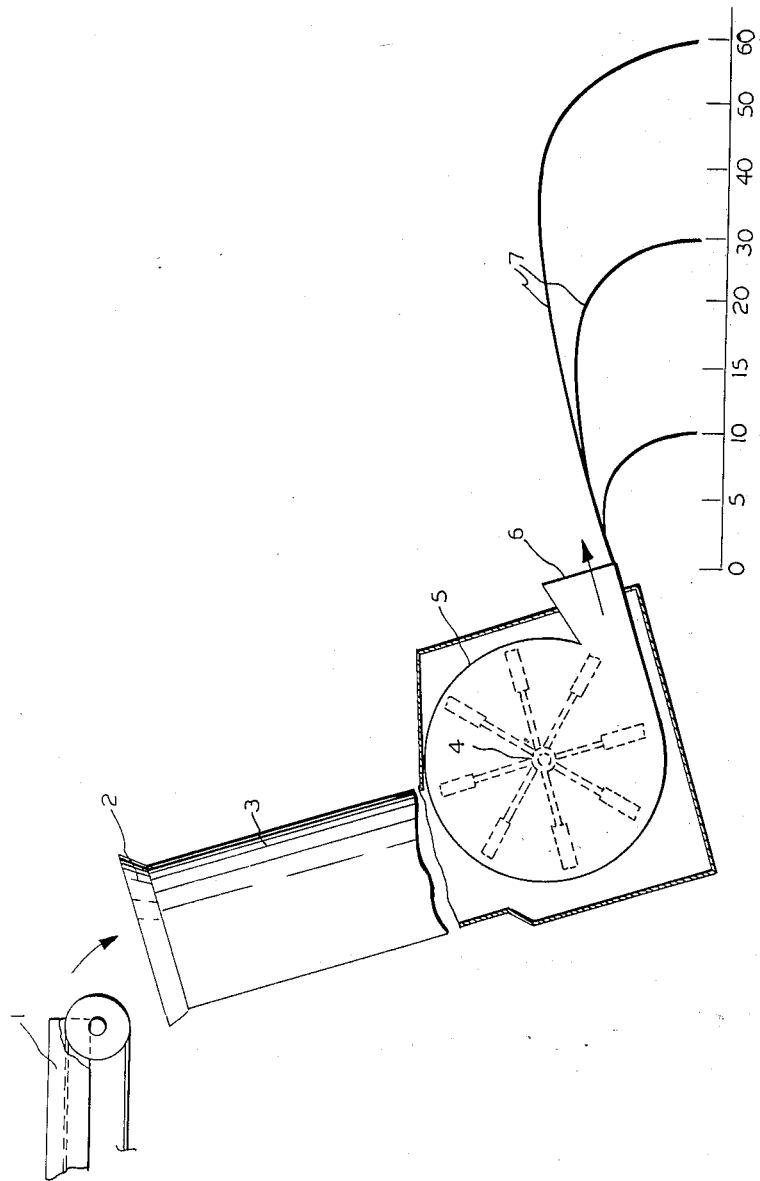
FIGURE 1 is a schematic illustration of the entire apparatus employed for the practice of this invention.

In FIGURE 1, item 1 is a canvas belt conveyor type feeder for feeding the cottonseed through the seed inlet 2 of the cleaner-fractionator 3 which disentangles or "opens" the cottonseed, makes them substantially individualized particles, and accelerates these particles in a stepwise manner to the ultimate desired particle projection speed. A series of spiked rotary units (a single unit shown as 4), containing rubber-covered tips on the spikes to protect the cottonseeds against hulling, are employed. The spiked rotary unit is rotatably mounted within a casing 5, whose inner surface contoured with respect to the rotary element to insure flow of the seed to the rotor tips and to direct and restrict seed following opening and acceleration through the series of opener-accelerator units to seed outlet 6. Following opening and acceleration, the seed outlet 6 directs the seed from the cleaner-fractionator and the trajectories 7 of the flight patterns of the projected particles result in floor pattern distributions of the seed and foreign matter as represented by the portions set off and graduated from 0 to 60 feet.

Figure 2:
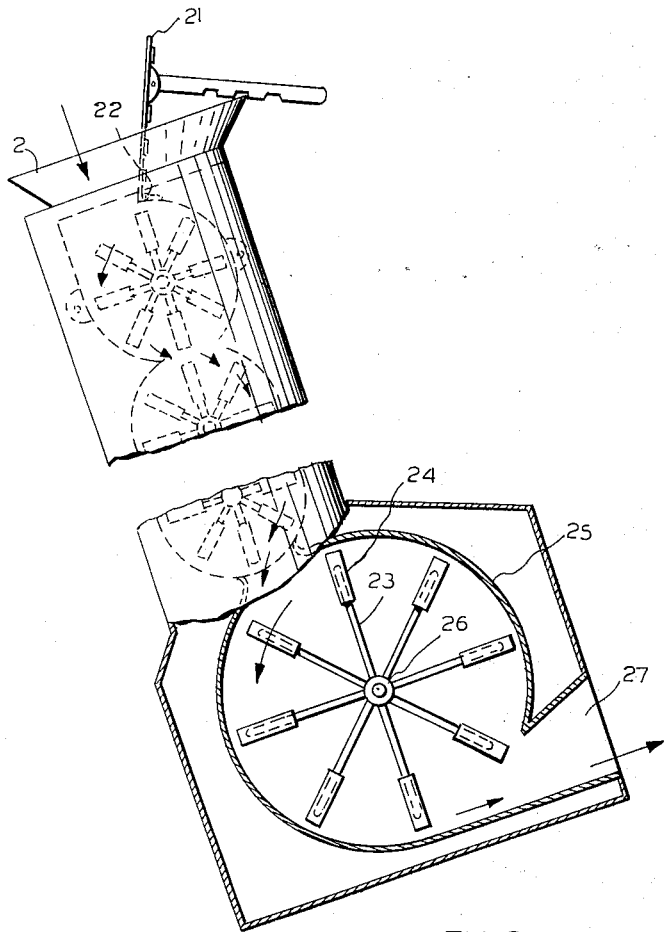
FIGURE 2 is a cross-sectional side view of the cottonseed cleaner and fractionator and FIGURE 3 is a detailed view of one of the rubber-tipped spokes.

As can be seen from the direction of rotation shown by the arrows in FIGURE 2, the embodiment of the invention there shown has an odd number of stages indicated by I, II, $(n-1)$ and $(n)$. This will be apparent if one considers stages II and $(n-1)$ to represent the broken halves of a single stage, thus resulting in a three-stage apparatus. Seed inlet 2 (as in FIGURE 1) is provided with an adjustable baffle 21 to properly direct incoming seed into the first stage of the accelerator. The rotary unit of the several stages are provided with spikes 23 tipped with rubber or other suitable elastomer 24, and are rotatably mounted within individual communicating casings 25, so designed that the flow of cottonseed is directed downward into contact with the rubbery-covered tips of the rotating spikes. The casing around the rotary unit of the $n$th (final) stage is not precisely concentric with the unit. The clearances at the seed entry and exit positions of this $n$th stage are greater to insure positive entry and positive exit of the seed without risk of hulling or shattering the seed. The spikes 23 on the rotor shaft 26 are spaced parallel to each other and perpendicular to the axis on 2-inch centers in each row, and the peripheral circumferential spacing of each row in the first through the $n-1$th stage is 4.7 inches and the the $n$th stage is 9.5 inches. Excessive clearance is provided at the throat of the seed outlet 6 and its upper surface is flared at an angle of not less than about 20° or more than about 30° positioned to provide substantially unrestricted discharge of the opened and accelerated seed and foreign material.

Figure 3:

FIGURE 3 is a detailed enlarged view of one of the rubber-tipped spikes where.

The feed opening feature of the device and the use of the flared discharge is extremely important, since effective separation patterns can be achieved particularly at low capacities only if the cottonseeds are completely disentangled substantially individualized. For the examples given, the cleaner-fractionator functions to make a dispersion or disentanglement of the various particles in the seed by employing multiple stages of opening and stepwise acceleration prior to discharge of the cottonseed. The present invention is not limited to the use of any specific number of stages. Peripheral speeds attained by the tips of the rotating spikes in six stages are about 500, 1000, 2000, 3000, 5000, and 8200 feet per minute, respectively. In this embodiment, the first five stages are 12 inches in diameter and the sixth stage is 24 inches in diameter. The six stages and their casings, the inner surfaces of which are contoured with respect to the several rotary units to insure movement of the seeds in a gently curved path to the flared discharge 6 at the sixth or final stage, are contained in a substantially vertical housing 27. The use of more or of fewer than six stages is a matter of choice. It will be apparent to those skilled in the art that, for apparatus having six or any other even number of stages, the first stage would have to rotate in the direction indicated by the arrow on Stage II in FIGURE 2 and that baffle 21 would have to open on the right hand side of feed opening 2, rather than on the left, as shown.

Otherwise, cottonseed would be thrown back out of the top of the inlet. It is desirable to use more than three stages in processing extremely dirty and tangled cottonseed. It is essential that the opening and the acceleration of the cottonseed be carried out in more than one stage since acceleration of the seed in a single stage would require peripheral rotor speeds that would hull or shatter the cottonseeds despite the fact that the spiked tips of the rotor are rubber-covered. Moreover, stepwise acceleration of the cottonseed has the further advantage of providing more thorough opening and disentangling of the cottonseeds than if they were passed through a single opening and accelerating stage.

The velocity at which the particles are projected into air can be varied widely, but must be sufficiently great so that the particles move through the air at a speed relative to the air at which the wind resistance of the particles appreciably affects the distance they are carried through the air by their own momentum. In general, the particles are projected at a sufficient velocity when they are given a momentum which, in the case of substantially linter-free normally developed cottonseeds, is enough to carry the seeds through a linear distance of 40 feet from the point of projection into still air. Although projection of the particles into still air is preferred, they can also be projected into moving air, for example air moving across or preferably toward the path along which the particles are projected. When the particles are projected into air which is moving countercurrently (toward) the direction of projection of the particles, the particles can be projected at a lower ground speed whose value will be dependent upon the velocity of the countercurrent air into which the particles are projected. In any case, it is necessary that the particles being projected into moving air be given sufficient momentum to allow them to pass through an amount of air equivalent to the amount of air they would pass through if the particles traveled a linear distance of about 40 feet through still air.

In general, where the particles are projected into still air, they are preferably projected at a velocity of at least about 135 feet per second (or about 93 miles per hour) relative to the ground. The particles can be projected so that they attain an airspeed which is greater than about 135 feet per second by substantially any amount.

The cottonseed particles leaving the cleaner-fractionator can be projected in any direction in which their momentum tends to carry them through the air a sufficient distance away from the device, such distance being previously defined. Projecting the particles in a substantially horizontal direction is preferred, and projecting the particles at an angle of from about 0° to 15° above the horizontal is particularly preferred. Particularly sharp fractionations of batches of undelintered cottonseed and batches of cottonseed from which the first cut linters have been removed have been obtained by projecting the disentangled cottonseed particles in a direction of from about 0° to 15° above the horizontal into still air at a velocity of at least about 135 feet per second.

Operation and use of the apparatus of this invention are described in the examples which follow. Table I, below, identified the several feeds which were used, while Table II lists the foreign matter content of these feeds.

TABLE I

| Example No. | Seed Lot | Total Foreign Matter Content, Percent | Linters Content Percent |
|---|---|---|---|
| 1 (Run 145) | 6177 | 2.53 | 11-12.5 |
| 2 (Run 146) | 6177 | 2.24 | 11-12.5 |
| 3 (Run 163) | 5865 | 1.65 | 9-10 |
| 4 (Run 164) | 5865 | 1.85 | 9-10 |

TABLE II

| Example No. | Boll Wall Content, Percent | | Stems, Percent | Boll Bases, Percent | Fines, Percent | Total F.M., Percent |
|---|---|---|---|---|---|---|
| | Inner | Outer | | | | |
| 1 | 0.29 | 0.29 | 0.85 | 0.35 | 0.12 | 2.53 |
| 2 | 0.22 | 0.71 | 0.91 | 0.35 | 0.05 | 2.24 |
| 3 | 0.08 | 0.51 | 0.40 | 0.37 | 0.29 | 1.65 |
| 4 | 0.08 | 0.50 | 0.45 | 0.43 | 0.39 | 1.85 |

*Example 1*

Cottonseed used for this test run was from a lot of about 2800 pounds of undelintered cottonseed as received from a gin. The cottonseed used had a moisture content of about 7 percent.

The cottonseed in 200 pound lots was passed across a conventional shaker screen clothed with 0.5 inch diameter perforated metal cloth to remove large field trash, metal, lint, and unattached linters, grabbots, and the like. The entire lot of seed was then passed over a magnet and then distributed in 7 pound increments to twenty-six 55 gallon drums. To promote a greater degree of uniformity, the first 7 pound increment of each 200 pound portion of seed was placed in the drum next in line to the preceding first increment. This procedure was repeated until the entire lot of seed was distributed to the drums. Finally, the approximately 100 pounds of seed in each drum was transferred to a 100 pound sack and labeled as a sample.

A drag conveyor was modified and employed to give a constant feed rate to the cleaner-fractionator. A modification of the drag conveyor consisted of substituting a canvas belt for the steel drag element. Chain sprockets at each end of the drag conveyor were enclosed with sheet metal to form a drum or pulley for the canvas belt.

To insure uniformity in feeding, the 100 pound sack cottonseed sample was transferred to containers each of which held 14 pounds (an amount sufficient to provide a one seed thick layer of cottonseed over the full area of the canvas belt). During the experimental run, requisite capacity was obtained by operating the modified drag conveyor at a speed of 36 feet per minute and to continue to provide a one seed thick layer of cottonseed for a period of time sufficient to feed the entire 14 pounds, usually one minutte. This procedure was repeated during each run until the full 100 pounds of seed had been fed to the cleaner-fractionator. In this particular example the opener-accelerator units operated to accelerate the seed in stepwise fashion in six stages to a speed in the final sixth stage of approximately 1300 revolutions per minute (peripheral speed 8200 feet per minute). The peripheral speeds in the first through the fifth stages were about 500, 1000, 2000, 3000, and 5000 feet per minute, respectively. The final projection speed of the particles from the sixth stage was about 8200 feet per minute. The particles were projected into still air at a projection angle of about 15° from the horizontal. The momentum of the particles in conjunction with gravity and air resistance produced on the floor in front of the machine an elongated oval shaped pattern leading away from the apparatus. A floor pattern of seed and foreign material was obtained that extended from a few feet forward of the point of discharge to a point approximately 45 feet away from the apparatus. The width of the pattern was limited by curtain walls located 12 feet apart. Transverse lines were drawn across the floor in the pattern area at distances of 5, 10, 15, 20, 25, 30, 35, 40, 50, and 60 feet from the point of emergence of the seed from the final stage of the cleaner-differentiator. Particles which landed in the areas located between these lines were separately collected. By a visual examination the distribution and description of foreign matter and seed in the various fractions of the projection pattern was made.

DESCRIPTION OF FRACTIONS

Fraction:
(1) Distance, 0 to 5 feet—
Substantially 100% by weight of foreign material consisting in the main of sand, dirt, lint, seed hull fragments, field trash such as fragments of stem, cotton boll and leaf.
(2) Distance, 5 to 10 feet.—
Approximately 28% by weight of foreign material consisting of sand, dirt, lint, fragments of hull, stems, cotton boll and leaves. All cottonseed in this portion of the patters were of very low density.
(3) Distance, 10 to 15 feet—
Approximately 16% by weight of foreign material. All cottonseed in this portion of the pattern were of low density. Foreign material predominantly medium size particles of field trash such as boll particles and stems up to one inch in length. There appears in this fraction for the first time some small "knobs" (the connections between the cotton boll and its stem).
(4) Distance, 15 to 20 feet—
Approximately 5% by weight of foreign material. All cottonseed of moderately low density. Foreign matter essentially the same type as that in fraction 3 with the exception that there were no fines.
(5) Distance, 20 to 25 feet—
Approximately 1.3% by weight of foreign material. All cottonseed in this fraction of average density. Foreign material similar in type to that contained in fractions 3 and 4 with exception that individual particles are slightly larger (boll fragments up to approximately ¾ of an inch and stem fragments about 2½ inches in length) and there were no fines.
(6) Distance, 25 to 30 feet—
Approximately 1.0% by weight of foreign matter. All cottonseed of average density. Foreign matter essentially the same type as in fractions 3, 4, and 5 except stem fragments were longer (about 3 inches in length). No shale or fines were present. Linters are of good quality with respect to staple length and color.
(7) Distance, 30 to 45 feet—
Approximately 1.2% by weight foreign material. All cottonseed in this fraction of relatively high density. Foreign matter essentially the same type as in preceding fractions except boll fragments tend to be larger (up to about 1 inch) and stem fragments tend to be much shorter and of greater diameter. There is a very noticeable decrease in linters content on seed located at the forward end of the pattern as compared to the beginning of this fraction.

All of the above fractions as well as a sample of the material originally fed to the projection apparatus were subjected to an analysis of foreign matter content. The distribution of foreign matter in the fractions is given in Table III.

Seed fractionating data, mass of 100 seed, was obtained for the feeds and for each of the Examples 3 and 4. In these determinations seed resulting from the analysis of samples for foreign material were subjected to further mixing and quartering procedures until the combined weight of two opposite quarters approximated one pound or less. After careful mixing and spreading out, 100 seed were selected from various locations of the seed area. Only whole seed, i.e., seed with intact meats, hulls, and linters, were selected.

As evident from the description of fractions in the foregoing Example 1 cottonseed of essentially average or prime foreign matter content (1.0% or less) as well as of moderately high density is collected in the fraction 20 to 45 feet from the point of projection. Furthermore, there is a noticeable and consistent tendency for the seeds carrying the shorter linters to travel farther than those carrying the longer linters fibers. For example, the amount of linters present on the seeds is beginning to decrease at a distance of about 30 feet from the point of projection, and progressively decreases throughout the remaining range to the 45-foot projection distance. Thus, it is apparent that the present process can be used not only to segregate the cottonseed of the highest density (i.e., those containing the highest percentages of oil, nitrogen, and the lowest percentages of the objectionable free fatty acids) but also to fractionate the linter-carrying normally-developed seeds on the basis of the type of linters which are attached to them.

*Example 2*

A comparable sub-portion of the same 2800 pound lot of cottonseed employed in the fractionation experiment described in Example 1 was prepared in the same manner as described in Example 1 and the seed were projected under the same conditions with the exception that a layer of cottonseed 1½ inches thick was used over the full area of the canvas belt. Uniformity in feeding the 100 pound sack cottonseed sample was insured by transferring to containers each of which held 20 pounds. During the experimental run, requisite capacity was obtained by operating the modified drag conveyor at a speed of 84 feet per minute and to continue to provide a 1½ inch layer of cottonseed for a period of time sufficient to feed the entire 20 pounds, usually 9 seconds. This procedure was repeated until the full 100 pounds of seed had been fed to the cleaner-differentiator. The distribution of foreign matter in the fractions is given in Table IV.

*Example 3*

A 140 pound sub-portion of a new 400 pound lot of cottonseed obtained after first-cut delintering was prepared using the same principal of mixing as described in Example 1 and the seed were projected under the same conditions.

Cleaning and seed fractionation data for the cottonseed projected under these conditions are given in Table V.

*Example 4*

A comparable sub-portion of the same 400 pound lot of cottonseed employed in the cleaning and fractionation experiment described in Example 3 was projected under the same condtions as Example 2.

Cleaning and seed fractionation data for the cottonseed projected under these conditions are given in Table VI.

Results for Examples 1 and 2 compared with those of 3 and 4 primarily show the effect of linters content on cleaning and fractionation.

Seed fractionation effect, mass of 100 seed, is included for Examples 3 and 4 only.

Cleaning the high linters content seed of Examples 1 and 2 is not as effective as with the first-cut delintered seed of Examples 3 and 4.

TABLE III.—FOREIGN MATTER CONTENT OF COTTONSEED FRACTIONATED UNDER EXAMPLE 1

| Location of Fraction From Point of Projection (Feet) | Percent of Total Feed Recovered | Percent Foreign Matter | Percent Outer Boll Wall | Percent Inner Boll Wall (Shale) | Percent Boll Bases | Percent Stems | Percent Fines |
|---|---|---|---|---|---|---|---|
| Feed | | 1.53 | 0.92 | 0.29 | 0.35 | 0.85 | 0.12 |
| 0-5 | 0.07 | 100.0 | | | | | 100.0 |
| 5-10 | 0.33 | 28.4 | 6.50 | 15.2 | 0 | 3.2 | 3.5 |
| 10-15 | 3.35 | 15.7 | 5.20 | 4.9 | 0.1 | 4.1 | 1.4 |
| 15-20 | 21.20 | 4.7 | 2.60 | 0.27 | 0.22 | 1.6 | 0 |
| 20-25 | 40.20 | 1.25 | 0.34 | 0.04 | 0.27 | 0.60 | 0 |
| 25-30 | 25.92 | 1.00 | 0.13 | 0 | 0.47 | 0.40 | 0 |
| 30-45 | 8.93 | 1.22 | 0.09 | 0 | 0.76 | 0.37 | 0 |

TABLE IV.—FOREIGN MATTER CONTENT OF COTTONSEED FRACTIONATED UNDER EXAMPLE 2

| Location of Fraction From Point of Projection (Feet) | Percent of Total Feed Recovered | Percent Foreign Matter | Percent Outer Boll Wall | Percent Inner Boll Wall (Shale) | Percent Boll Bases | Percent Stems | Percent Fines |
|---|---|---|---|---|---|---|---|
| Feed | | 2.24 | 0.71 | 0.22 | 0.35 | 0.91 | 0.05 |
| 0-5 | 0.02 | 100.0 | | | | | 100.0 |
| 5-10 | 0.13 | 53.4 | 10.5 | 28.2 | 0 | 2.3 | 11.4 |
| 10-15 | 1.59 | 19.6 | 6.5 | 3.3 | 0.3 | 3.4 | 0.8 |
| 15-20 | 15.35 | 3.12 | 1.27 | 0.25 | 0.36 | 1.24 | 0 |
| 20-25 | 33.20 | 1.80 | 0.56 | 0.13 | 0.24 | 0.87 | 0 |
| 25-30 | 35.26 | 1.83 | 0.50 | 0.11 | 0.37 | 0.85 | 0 |
| 30-45 | 14.45 | 1.40 | 0.22 | 0.05 | 0.55 | 0.58 | 0 |

TABLE V.—FOREIGN MATTER CONTENT OF COTTONSEED FRACTIONATED UNDER EXAMPLE 3

| Location of Fraction From Point of Projection (Feet) | Percent of Total Feed Recovered | Percent Foreign Matter | Percent Outer Boll Wall | Percent Inner Boll Wall (Shale) | Percent Boll Bases | Percent Stems | Percent Fines | Mass 100 Seed (Grams) |
|---|---|---|---|---|---|---|---|---|
| Feed | | 1.65 | 0.51 | 0.08 | 0.37 | 0.40 | 0.29 | 10.8 |
| 0-5 | 0.18 | 57.7 | 3.73 | 11.57 | 0 | 1.87 | 40.49 | 4.0 |
| 5-10 | 2.00 | 15.3 | 4.47 | 1.28 | 0.64 | 3.44 | 5.46 | 5.1 |
| 10-15 | 12.27 | 3.8 | 1.43 | 0.22 | 0.40 | 0.94 | 0.81 | 5.3 |
| 15-20 | 34.70 | 1.2 | 0.46 | 0.02 | 0.30 | 0.40 | 0 | 5.4 |
| 20-25 | 32.91 | 0.85 | 0.20 | 0.01 | 0.42 | 0.23 | 0 | 11.4 |
| 25-30 | 14.37 | 0.41 | 0.07 | 0 | 0.26 | 0.09 | 0 | 12.3 |
| 30-35 | 2.76 | 0.76 | 0.08 | 0 | 0.67 | 0 | 0 | 12.7 |
| 35-40 | 0.62 | 0.60 | 0.16 | 0 | 0.39 | 0.05 | 0 | 12.4 |
| 40-45 | 0.18 | 2.20 | 0.56 | 0 | 1.67 | 0 | 0 | 10.9 |
| 45-50 | 0.01 | 0 | 0 | 0 | 0 | 0 | 0 | 10.1 |

TABLE VI.—FOREIGN MATTER CONTENT OF COTTONSEED FRACTIONATED UNDER EXAMPLE 4

| Location of Fraction From Point of Projection (Feet) | Percent of Total Feed Recovered | Percent Foreign Matter | Percent Outer Boll Wall | Percent Inner Boll Wall (Shale) | Percent Boll Bases | Percent Stems | Percent Fines | Mass 100 Seed (Grams) |
|---|---|---|---|---|---|---|---|---|
| Feed | | 1.85 | 0.50 | 0.08 | 0.43 | 0.45 | 0.39 | 10.8 |
| 0-5 | 0.34 | 53.4 | 3.61 | 4.53 | 0 | 2.26 | 47.74 | 6.6 |
| 5-10 | 2.85 | 15.2 | 3.91 | 1.37 | 1.0 | 2.34 | 7.42 | 6.4 |
| 10-15 | 13.20 | 2.95 | 1.29 | 0.04 | 0.33 | 1.29 | 0 | 8.9 |
| 15-20 | 33.20 | 1.19 | 0.40 | 0.01 | 0.33 | 0.46 | 0 | 10.6 |
| 20-25 | 28.25 | 0.80 | 0.18 | 0 | 0.46 | 0.16 | 0 | 11.0 |
| 25-30 | 14.42 | 0.60 | 0.09 | 0 | 0.46 | 0.05 | 0 | 11.1 |
| 30-35 | 5.17 | 0.76 | 0.14 | 0 | 0.60 | 0.01 | 0 | 12.4 |
| 35-40 | 1.59 | 0.86 | 0.14 | 0 | 0.72 | 0 | 0 | 12.9 |
| 40-45 | 0.70 | 0.86 | 0.19 | 0 | 0.66 | 0 | 0 | 11.9 |
| 45-50 | 0.28 | 0.78 | 0.34 | 0 | 0.43 | 0 | 0 | 11.7 |

Overall differences in the effectiveness of the cleaning and fractionating accomplished at the 10 and 100 tons per 24 hours rates are greater with the high linters content ginned seed, Examples 1 and 2, as compared with those of the first-cut delintered seed, Examples 3 and 4.

We claim:

1. A cleaner-fractionator apparatus for individualizing unopened cottonseed containing occluded foreign matter and for accelerating in a stepwise manner and projecting individualized cottonseed into substantially still air, which apparatus comprises:
   (a) a plurality of spiked rotary units in substantially vertical array;
   (b) integral communicating casing elements having top inlet openings and bottom outlet openings and enclosing severally the said rotary units, said casing elements being defined by parallel lateral walls and respective front and rear walls contoured to the shape of the enclosed rotary units, each casing element being provided with a bottom outlet communicating with the top inlet of the below adjacent casing element, the inlet opening of the topmost casing element being located, relative to the direction of rotation of the respective enclosed rotary unit, to take in unopened cottonseed, the outlet opening of the lowermost casing element being located, relative to the direction of the respective enclosed rotary unit, to project individualized and accelerated cottonseed in an essentially horizontal direction;
   (c) means for individually rotatably supporting the respective spiked rotary units in said casing elements; and
   (d) drive means for rotating each spiked rotary unit at a peripheral speed greater than the peripheral speed of the preceding above adjacent unit and in a direction counter the rotation of the adjacent rotary unit.

2. The apparatus of claim 1 wherein the outlet opening of the lowermost casing is directed outward as a nozzle at substantially right angles to the apparatus, the outward flaring angle of the nozzle not less than 20° and not more than 30°.

3. The apparatus of claim 1 wherein the number of spiked rotary units is six and said units are adapted to rotate at respective increasing peripheral speeds of 500, 1000, 2000, 3000, 5000, and 8200 feet per minute, the uppermost unit rotating at the lowest speed.

4. The apparatus of claim 3 wherein the outlet opening of the lowermost casing is directed outward as a nozzle at substantially right angles to the apparatus, said nozzle flaring outward at an angle of the nozzle not less than 20° and not more than 30°.

References Cited by the Examiner

UNITED STATES PATENTS

| | | | |
|---|---|---|---|
| 279,720 | 6/1883 | Crowson | 19—93 |
| 622,031 | 3/1899 | Archer | 209—120 X |
| 1,078,833 | 11/1913 | Cook | 19—93 |

ROBERT B. REEVES, *Primary Examiner.*

DONALD W. PARKER, *Examiner.*

D. NEWTON, *Assistant Examiner.*